US011176090B2

(12) United States Patent
Davis et al.

(10) Patent No.: US 11,176,090 B2
(45) Date of Patent: Nov. 16, 2021

(54) VERIFICATION OF THE INTEGRITY OF DATA FILES STORED IN COPY-ON-WRITE (COW) BASED FILE SYSTEM SNAPSHOTS

(71) Applicant: International Business Machines Corporation, Armonk, NY (US)

(72) Inventors: Willard A. Davis, Rosendale, NY (US); James C. Davis, Blacksburg, VA (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 16/259,487

(22) Filed: Jan. 28, 2019

(65) Prior Publication Data

US 2020/0242075 A1 Jul. 30, 2020

(51) Int. Cl.
*G06F 16/00* (2019.01)
*G06F 16/11* (2019.01)
*G06F 11/14* (2006.01)
*G06F 16/178* (2019.01)

(52) U.S. Cl.
CPC ........ *G06F 16/128* (2019.01); *G06F 11/1435* (2013.01); *G06F 16/178* (2019.01); *G06F 2201/84* (2013.01)

(58) Field of Classification Search
CPC .. G06F 16/128; G06F 16/178; G06F 11/1435; G06F 2201/84
USPC ........................................................ 707/649
See application file for complete search history.

(56) References Cited

U.S. PATENT DOCUMENTS 8,027,958 B1 9/2011 Chapman
8,788,769 B2 7/2014 Abercrombie et al.
9,026,498 B2 5/2015 Kumarasamy
9,842,032 B2 12/2017 Blake
10,025,788 B2 7/2018 Davis et al.
10,140,303 B1* 11/2018 Patterson ............ G06F 11/1464
2013/0325824 A1* 12/2013 Shoens ................... G06F 16/16
707/698

(Continued)

FOREIGN PATENT DOCUMENTS

EP 2904501 B1 12/2017

OTHER PUBLICATIONS

Azagury et al., "Point-in-Time Copy: Yesterday, Today and Tomorrow," Storage Conference, 2002, pp. 259-270, retrieved from http://storageconference.us/2002/papers/d05bp-aaz.pdf.

(Continued)

*Primary Examiner* — Vincent F Boccio
(74) *Attorney, Agent, or Firm* — Zilka-Kotab, P.C.

(57) ABSTRACT

A computer-implemented method according to one embodiment includes performing a first process for each chunk of data of each file of a snapshot of a file system. The first process includes reading a given chunk of data of a given file of a first snapshot of the file system, and reading shadow records of a shadow file of the first snapshot. The given chunk of data is compared with the shadow records for determining whether a coherent state exists between the given chunk of data and one or more of the shadow records that were recorded in a snapshot creation window. In response to determining that no coherent state exists, an indication is recorded that the given chunk of data is corrupt. In response to determining that a coherent state exist, an indication is recorded that the given chunk of data is accurate.

18 Claims, 8 Drawing Sheets

(56) References Cited

U.S. PATENT DOCUMENTS

2016/0378528 A1 12/2016 Zamir
2017/0091086 A1 3/2017 Davis et al.

OTHER PUBLICATIONS

Wikipedia, "Write barrier," Wikipedia, 2016, 2 pages, retrieved from https://en.wikipedia.org/wiki/Write_barrier.

* cited by examiner

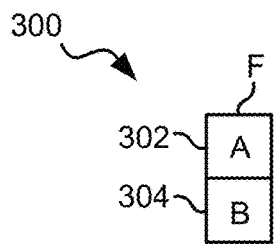
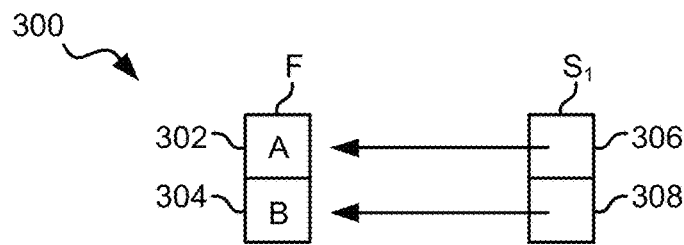
FIG. 3A  FIG. 3B
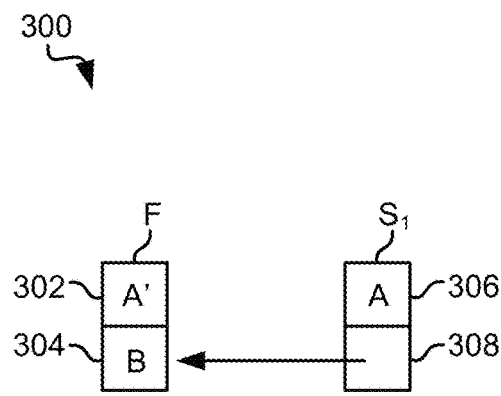
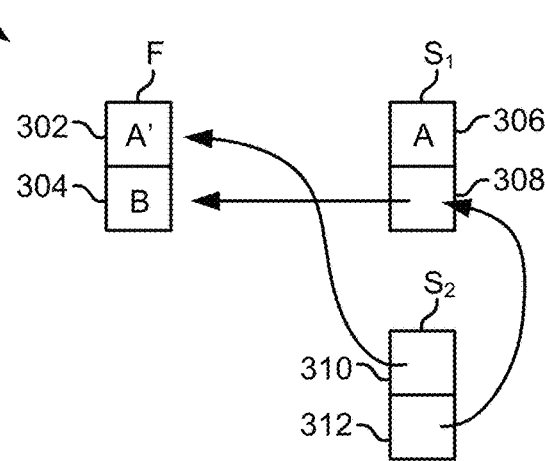
FIG. 3C  FIG. 3D
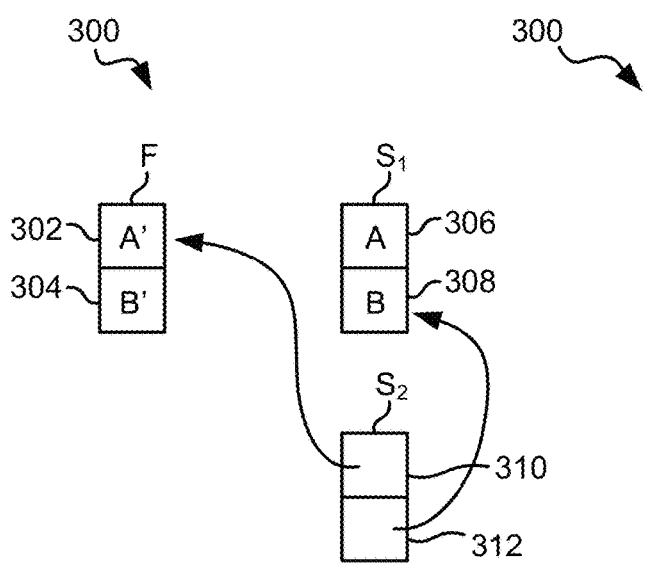
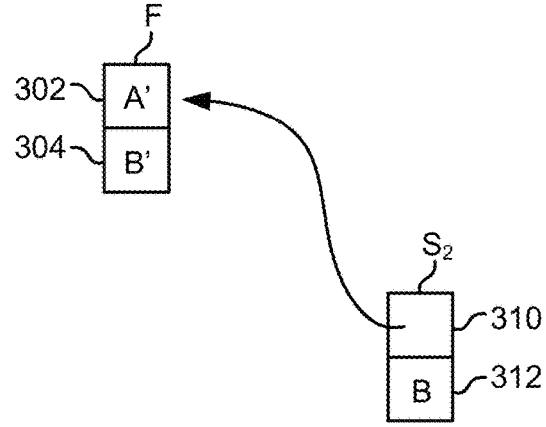
FIG. 3E  FIG. 3F

VERIFICATION OF THE INTEGRITY OF DATA FILES STORED IN COPY-ON-WRITE (COW) BASED FILE SYSTEM SNAPSHOTS

BACKGROUND

The present invention relates to data storage, and more specifically, this invention relates to verification of the integrity of data files stored in CoW based file system snapshots.

File systems are a critical component of a computing stack. Administrators, applications, and users rely on file systems in order to store data for a prolonged duration of time, and thus expect that any data stored in such file systems will be subsequently available for retrieval (in the data's original state).

One computer standard that defines a set of system calls that are used for interacting with a file system is known as a Portable Operating System Interface (POSIX). For example, some commonly used POSIX system calls that may be utilized for interacting with a file system in response to receiving an application level input/command include, e.g., an "open" function, a "read" function, a "write" function, a "close" function, etc. In the context of an application that interacts with a file system, e.g. a word processor, a visual output may be generated and output to a display for a user in response to one or more of such functions being performed on a file system. The visual output typically includes a representation of the most current contents of the file system and/or a sub-portion thereof.

File systems are sometimes tested for correctness. In addition, any inconsistency that a test application detects between the expected and actual state of data is often preferably reported with a high degree of specificity so that developers can effectively diagnose and debug the problem. More than such a test application merely reporting "incorrect data seen," diagnosing and debugging a problem often calls for richer metadata, e.g. the name of the particular file that is problematic, the exact byte of data that is inconsistent, a last time that the problematic file and/or inconsistent byte of data was known to be correct, the expected value(s), etc.

SUMMARY

A computer-implemented method according to one embodiment includes performing a first process for each chunk of data of each file of a snapshot of a file system. The first process includes reading a given chunk of data of a given file of a first snapshot of the file system, and reading shadow records of a shadow file of the first snapshot. The shadow records are associated with the given file of the first snapshot. The first process further includes comparing the given chunk of data of the given file of the first snapshot with the shadow records for determining whether a coherent state exists between the given chunk of data of the given file of the first snapshot and one or more of the shadow records that were recorded in a snapshot creation window. The snapshot creation window is between a most recently completed update performed on the file system prior to creating the first snapshot of the file system and a most recently initiated update performed on the file system that occurred prior to completion of the first snapshot of the file system. In response to determining that no coherent state exists between the given chunk of data of the given file of the first snapshot and one or more of the shadow records, an indication is recorded that the given chunk of data of the given file of the first snapshot is corrupt. In response to determining that a coherent state exist between the given chunk of data of the given file of the first snapshot and one or more of the shadow records, an indication is recorded that the given chunk of data of the given file of the first snapshot is accurate.

A computer program product for verifying an integrity of data files stored in copy-on-write based file system snapshots according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIGS. 3A-3F are logical representations of snapshot history, in accordance with one embodiment.

DETAILED DESCRIPTION

Figure 1:
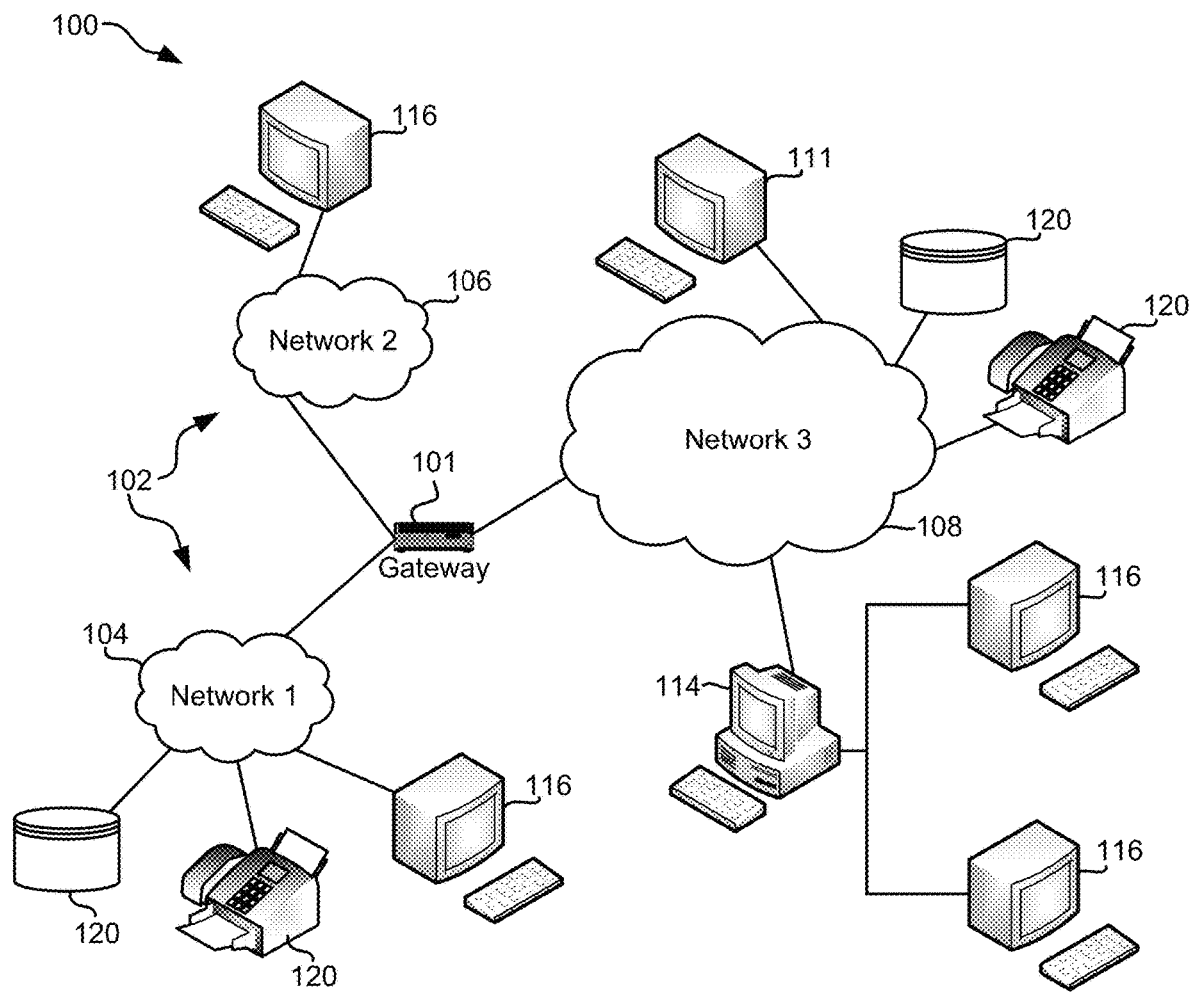
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for verifying the integrity of data files stored in CoW based file system snapshots.

In one general embodiment, a computer-implemented method includes performing a first process for each chunk of data of each file of a snapshot of a file system. The first process includes reading a given chunk of data of a given file of a first snapshot of the file system, and reading shadow records of a shadow file of the first snapshot. The shadow records are associated with the given file of the first snapshot. The first process further includes comparing the given chunk of data of the given file of the first snapshot with the shadow records for determining whether a coherent state exists between the given chunk of data of the given file of the first snapshot and one or more of the shadow records that were recorded in a snapshot creation window. The snapshot creation window is between a most recently completed update performed on the file system prior to creating the first snapshot of the file system and a most recently initiated update performed on the file system that occurred prior to completion of the first snapshot of the file system. In response to determining that no coherent state exists between the given chunk of data of the given file of the first snapshot and one or more of the shadow records, an indication is recorded that the given chunk of data of the given file of the first snapshot is corrupt. In response to determining that a coherent state exist between the given chunk of data of the given file of the first snapshot and one or more of the shadow records, an indication is recorded that the given chunk of data of the given file of the first snapshot is accurate.

In another general embodiment, a computer program product for verifying an integrity of data files stored in copy-on-write based file system snapshots includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
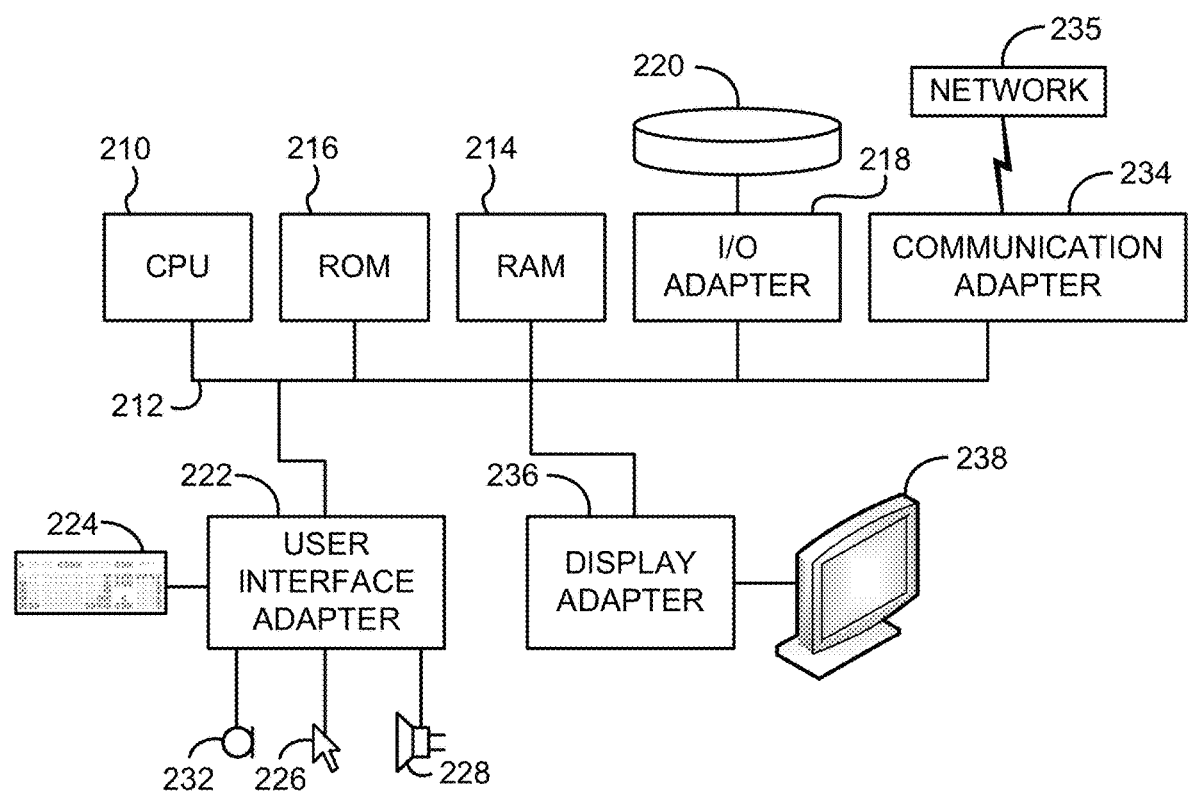
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

As mentioned elsewhere above, file systems are sometimes tested for correctness. In addition, any inconsistency that a test application detects between the expected and actual state of data is often preferably be reported with a high degree of specificity so that developers can effectively diagnose and debug the problem. More than such a test application merely reporting "incorrect data seen," diagnosing and debugging a problem calls for metadata, e.g. the name of the particular file that is problematic, the exact byte of data that is inconsistent, a last time that the problematic file and/or inconsistent byte of data was known to be correct, etc.

Various embodiments and/or approaches described herein include testing the integrity of data stored in a file system by considering data of snapshots. Specifically, as will be described herein, testing the integrity of data stored in a file system by considering data of snapshots includes initially verifying the contents of a snapshot and/or verifying the contents of a snapshot over time.

For contextual purposes, a snapshot is a point-in-time copy of some or all of the data currently in a file system. In other words, a snapshot may be taken at different levels of granularity, e.g., individual files, directory trees, the entire file system, etc. Moreover, a snapshot unit is typically a file, as a snapshot generally cannot be performed on only part of a file.

To make a snapshot lightweight, some implementations rely on a CoW technique also used in operating system page tables. CoW means that a snapshot and a "live" file system, e.g., a current state of the file system (herein referred to as "live file system") initially share references to the disk blocks underlying a file. When one of these shared data blocks is changed in the live file system, the change requires that the original contents of the block be copied into the snapshot in order for the snapshot to remain accurate; hence the name "Copy-on-Write." In a high-performance file system, particularly a distributed file system, implementing optimized snapshots is complex and error prone, though the errors themselves manifest in ways ranging from obvious to quite subtle.

From a practical perspective, it is important that the contents of snapshots are accurate. Snapshots are commonly used as a "hot backup" for replacing, in one example, accidentally-deleted files. This is because snapshots typically utilize less processing and storage to record a previous state of a file system than accessing previously stored backup copies of a state of a file system otherwise would. For example, as will be shown in FIGS. 3A-3F, creating snapshots sometimes include creating/amending pointers to instances of data, rather than making entire copies of a file system as is performed in creating backup copies.

Snapshots are also used as a staging area from which longer-term backups can be derived. In consequence, errors in a snapshot can propagate into other, more critical, backups. If a backup is derived from an incorrect snapshot, the backup will be inaccurate. When this backup is restored, e.g. after a disk failure, the result will be incorrect data and a disappointed user who was depending on the backup being accurate.

For purposes of a non-limiting example, a snapshot history of a file of a file system will be described in further detail below.

FIGS. 3A-3F depict a logical representation 300 of snapshot history, in accordance with one embodiment. As an option, the present logical representation 300 may be implemented in conjunction with features from any other embodiment listed herein, such as those described with reference to the other FIGS. Of course, however, such logical representation 300 and others presented herein may be used in various applications and/or in permutations which may or may not be specifically described in the illustrative embodiments listed herein. Further, the logical representation 300 presented herein may be used in any desired environment.

Referring first to FIG. 3A, logical representation 300 includes a file F having first and second blocks 302, 304 with data contents A, B (respectively).

A snapshot $S_1$ is taken of the file F in FIG. 3B. First and second blocks 306, 308, of the snapshot $S_1$ are pointers to blocks 302, 304 (respectively) of the file F.

In FIG. 3C, the data contents of the first block 302 of the file F is changed to A'. The original data of the first block 302 of the file F is copied, e.g., by a CoW, to the first block 306 of the snapshot $S_1$. Moreover, the data contents of the second block 304 of the file F remain unchanged.

A second snapshot $S_2$ is taken of the file F in FIG. 3D. A first block 310 of the second snapshot $S_2$ points to the data contents A' of the first block 302 of the file F. To clarify, the first block 310 of the second snapshot $S_2$ points to the data contents A' of the first block 302 of the file F because no write has yet been performed on the first block 310, and therefore the first block 310 of the second snapshot $S_2$ points to an actual instance of the data, e.g., on the first block 302. A second block 312 of the second snapshot $S_2$ points to the data contents of the second block 308 of the first snapshot $S_1$, which in FIG. 3D is B due to the second block 312 of the second snapshot $S_2$ pointing to the data contents B of the second block 304 of the file F.

Referring now to FIG. 3E, the data contents of the second block 304 of the file F is changed to B'. Moreover, a triggered CoW results in the second block 308 of the first snapshot $S_1$ receiving a copy of the data contents of the second block 304 of the file F prior to the CoW, e.g., B of FIG. 3D. The second block 312 of the second snapshot $S_2$ continues to point to the second block 308 of the first snapshot $S_1$.

In FIG. 3F, the first snapshot $S_1$ is deleted. If any other snapshots were pointing to user data in this snapshot that is no longer present in the live file system, this data is propagated to one of these other snapshot(s) and any other pointers to the data are updated to the destination snapshot(s). In FIG. 3F, e.g., B, of the second block 308 of the first snapshot $S_1$ is propagated to the second block 312 of the second snapshot $S_2$.

With a general overview of snapshot history provided above, it should be noted that there are various instances in which the process of utilizing snapshots may incorrectly record inaccurate data. Reference will now be made to an example of how inaccurate data is sometimes recorded. At some point during use of a file system, an update to the file system may incorrectly result in updated live data being visible in a snapshot. For example, a POSIX read command on the snapshot of a file may incorrectly output the current state of the file rather than the state at the time that the snapshot was taken. However, because the snapshot should only reflect the state of the file system at the time that the snapshot was taken, returning the current state of the file instead is inaccurate. Such an error could be transient and subsequently corrected, e.g. due to a race condition between the aforementioned POSIX read and a conflicting update to the file, or such an error could be permanent. Even a transient failure of this form, i.e. corrupt data in the file system, is problematic. For example, snapshots are utilized, e.g., read, for creating a backup copy of a file system. Therefore if an inaccuracy resides within a snapshot, the inaccuracy may be propagated to one or more backup copies of the file system. This has the potential effect of corrupting and compromising the entire backup chain of a file system.

To avoid such a data integrity issue, various embodiments and/or approaches described herein include ensuring the accuracy of snapshots of a file system. Such verification includes obtaining information, e.g., shadow files containing data about the contents of files in file system, for initially verifying the contents of a snapshot and/or verifying the contents of the snapshot and/or other snapshot(s) over time.

Referring to FIGS. 4A-4D, a flowchart of a method 400 is shown according to one embodiment. The method 400 may be performed in accordance with the present invention in any of the environments depicted in FIGS. 1-3, among others, in various embodiments. Of course, more or less operations than those specifically described in FIGS. 4A-4D may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Operation 402 of method 400 includes initiating a predetermined number of input/output tasks in a file system. The file system may include any known type of file system, however, in preferred approaches, the file system is a POSIX-compliant storage system that supports snapshots. Moreover, the type of input/output tasks performed may include any type of input/output tasks, and may be tasks that, e.g., are randomly selected to be performed, are scheduled to be performed, are preset to be performed for verifying a snapshot, etc.

It should be noted that generally, a snapshot may not be taken atomically but rather may span a start-finish window. Accordingly, in some approaches, method 400 includes beginning the creation of a snapshot of the file system. Upon beginning the creation of a snapshot of the file system, a time in which the snapshot begins being created is recorded, e.g., see operation 404 of method 400.

Depending on the file system's implementation of snapshots, there may be different potential valid states of the contents, e.g., files, of the snapshot as a result of creating of the snapshot. For example, in some approaches, where a file is not being modified, the contents of the snapshot are clear in that they match the live file system. However, in another approach, where the file is being modified upon the snapshot being created, at some time between the beginning and completion of capturing the snapshot of the file system, the file system may create a write barrier. In a file system, a write barrier is a mechanism, e.g., such as logic, that ensures that write operations of the file system are performed in predetermined order. Any write(s) that were pending before the write barrier will be reflected in the snapshot, while any write(s) submitted after the write barrier may not be reflected in the snapshot.

In some approaches the input/output tasks are performed before and during the capturing of the snapshot to ensure that the file system and write barrier are exercised during the capturing of the snapshot. In addition to the capturing of the snapshot, shadow files may be captured before, during, and/or after (subsequent completion of) the capturing of the snapshot using any one or more known techniques for capturing shadow files. The shadow files in some preferred approaches correspond to each file within the snapshot. For example, in one approach, the shadow files may include a copy of each of the files of the file system that exist during the capturing of the snapshot. As will be described soon elsewhere below, such shadow files may be used for verifying the initial contents of the snapshot and/or verifying the contents of one or more snapshots of the file system over time.

In one approach, a time of completion of the snapshot is recorded, e.g., see operation 406.

In the present approach, the input/output tasks are quiesced, e.g., paused, after the completion of capturing the snapshot, e.g., see operation 408. Quiesce of the input/output tasks may accomplished using any known standard inter-process communication techniques. For example, in one approach, UNIX® signals are used in order to quiesce the input/output tasks. In another approach, tests for file existence are additionally and/or alternatively used in order to quiesce the input/output tasks. In yet another approach, fcntl locks are additionally and/or alternatively used in order to quiesce the input/output tasks, as a convenient way to accomplish quiescing with minimal application-level communication in a distributed context.

With the input/output tasks of the file system quiesced, the shadow files of the files of the snapshot may be copied. The shadow files that are used in the verification described elsewhere below, e.g., see operations 412 and 415, are obtained subsequent to the quiesce of the input/output tasks of the file system in order to ensure that the shadow files are current, e.g., up-to-date. In some approaches, copies of the shadow files may contain checksums and a history of the files in the snapshot.

According to some approaches, a copy is made of the shadow files for each file of the file system that is to be verified, e.g., see operation 410. Moreover, the beginning and completion time of the snapshot may be noted. In one approach, the copy may be stored locally in the file system. However, in another approach, the copy may additionally and/or alternatively be stored in any other location. In addition to storing the copy of the shadow files, the copy of the shadow files may be stored with an association to the snapshot. In other words, each copy of the shadow files may be stored with an indication of which particular snapshot the copy is to be used for verifying. For example the shadow files saved when the first snapshot is created may be stored with an indication that they are to be thereafter used in verifying the first snapshot. Accordingly, in order to verify the first snapshot, the indication may be accessed to determine which copy of shadow files are to be used for the verifying. In any file system instantiation in which snapshots are immutable, i.e. cannot be modified, the copy of the shadow file associated with the file system instantiation is in some approaches preferably also be immutable except for a subsequent validation step as described elsewhere below. If a snapshot can be modified, e.g. as in IBM Generally Parallel File System's (GPFS's) "file clone" feature (IBM has a place of business at 1 New Orchard Road Armonk, N.Y. 10504-1722, United States), then the copy of the shadow file may become a mutable shadow file in its own right.

As will be described elsewhere below, e.g., see operation 412, in some preferred approaches, the shadow files are associated with the snapshot. For example, one technique that may be used for associating the shadow files with the snapshots includes copying each shadow file into a new directory with the same name as the snapshot. During verification of the initial contents of the snapshot, e.g., as will be described in operation 412, a gap that exists between a file system-level write barrier and the application-level quiesce of input/output tasks may be considered.

In another approach, a lighter-weight technique for obtaining a point-in-time copy of shadow files includes keeping the shadow file in the file system along with other files, and capturing a snapshot of a shadow file any time that the file it tracks is part of a snapshot. Although this approach is conceptually simpler, layering validation on top of mechanisms in the file system under test (viz. depending on that system's implementation of snapshots) may make this approach vulnerable to bugs that are already present in and corrupting the file system being tested. This simpler approach may, however, be useful in resource-constrained settings.

Operation 412 of method 400 includes verifying the initial contents of the snapshot. As will become apparent to one of ordinary skill in the art upon reading the descriptions of various approaches and/or embodiments herein, such verification of the contents of the snapshot may be performed on the initial contents of the snapshot, e.g., see first process of FIG. 4B, and/or on the contents of the snapshot over time, e.g., see second process of FIG. 4D. These two cases cover essentially all possibilities in which data of a file of a snapshot may be corrupt. Accordingly, by preferably verifying the initial state of a snapshot as well as the state of a snapshot thereafter at any arbitrary time, the contents of the snapshot are always correct by induction.

Figure 4A:
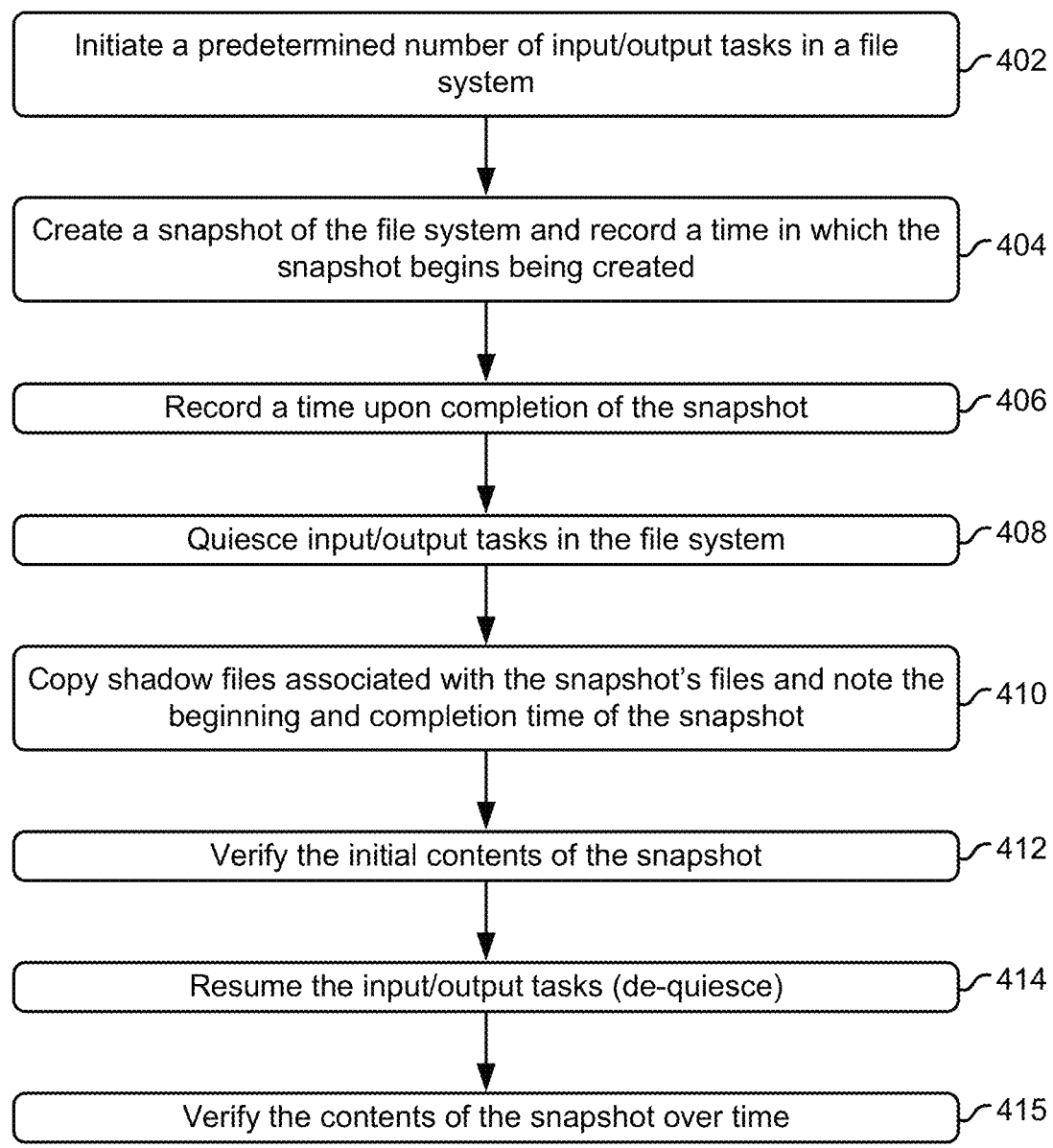
FIG. 4A is a flowchart of a method, in accordance with one embodiment.
Figure 4B:
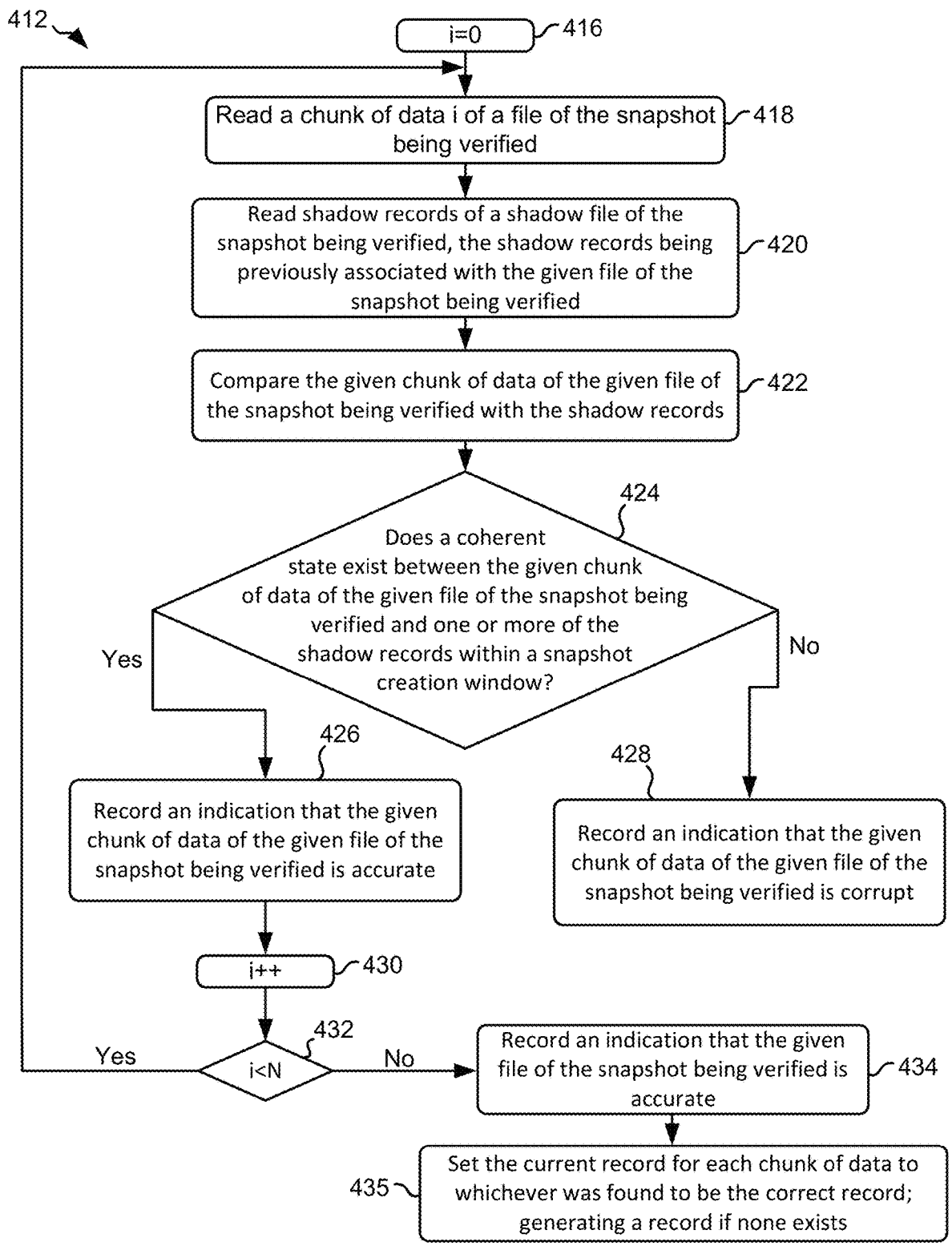
FIG. 4B is a flowchart of sub-processes of an operation of the flowchart of the method of FIG. 4A.

Referring now to FIG. 4B, several sub-processes are illustrated in accordance with one embodiment, one or more of which may be used to perform operation 412 of FIG. 4A. However, the sub-processes of FIG. 4B are illustrated in accordance with one embodiment which is in no way intended to limit the embodiments and/or approaches described herein.

It should be noted that although the sub-processes of the following descriptions of FIG. 4B refer to a first process being performed on a given chunk, e.g., application block, of data of a given file of a first snapshot of the file system, in some approaches, the first process is performed for each chunk of data of each file of the snapshot of the file system. For example, note that the logical path of FIG. 4B is performed on a first given chunk of data i, e.g., see i=0 of sub-operation 416, and returns to sub-operation 418 for as long as until each of the chunks N of data of a given file of the snapshot are evaluated, e.g., see i++ and i<N of sub-operations 430-432. Similarly, although the sub-processes of the following descriptions of FIGS. 4B-4C refer to a "first snapshot" being verified, such a term is not intended to be limited to a snapshot that is performed first with respect to temporality. In other words, the first snapshot may refer to any created snapshot that is being verified. According to various approaches, such snapshots may be created from any source. For example one or more of such snapshots may be, e.g., created by the file system, by hardware such as a storage enclosure that contains one or more disks on which data of the file system is stored, etc. Also depending on the approach, such snapshots may be obtained at any time, e.g., every minute, every hour, once a day, etc. In some approaches, one or more of such snapshots may correspond to different parts of the file system, e.g., a fileset, a file, a directory, etc.

With continued reference to FIG. 4B, in one approach, the first process for verifying the initial contents of the snapshot includes reading a given chunk of data of a given file of a first snapshot of the file system, e.g., see sub-operation 418.

Sub-operation 420 includes reading shadow records of a shadow file of the first snapshot. As described elsewhere herein, the shadow records are preferably previously associated with the given file of the first snapshot.

The given chunk of data of the given file of the first snapshot is compared with the shadow records, e.g., see sub-operation 422. Each chunk of data of the given file preferably contains internally consistent data in order for a coherent state to exist. Depending on the approach, internally consistent data may exist in the given file where the expected contents of each chunk of data, e.g., based on contents of a read header of the data, match one or more of the shadow records that were previously recorded. For example, it may be assumed that a data chunk includes a header followed by a data region, where the data region contains a pattern that can be deduced from the header. Moreover, the shadow records may include some metadata and a copy of the header region. Accordingly, in one approach, internally consistent data may be determined to exist in a given file in response to determining, e.g., using a known comparison technique, that each data chunk of the given file matches the contents of the same file in the shadow record.

Accordingly, with continued reference to method 400, in one approach, it may be determined whether a coherent state exists between the given chunk of data of the given file of the first snapshot and one or more of the shadow records that were previously recorded, e.g., see decision 424. In one approach, a coherent state exists between the given chunk of data of the given file of the first snapshot and one or more of the shadow records that were previously recorded when the chunk of data is reflected in the shadow records. It may be assumed that the shadow record contains an indication of what at least the last few data chunks at a given offset were. Accordingly, as will be described in further detail below, the possible valid shadow records, i.e., the ones that were written between the start of creating the snapshot and when the snapshot was definitely finished, are considered to ensure that the data in the file matches one of the possible records.

Figure 4C:
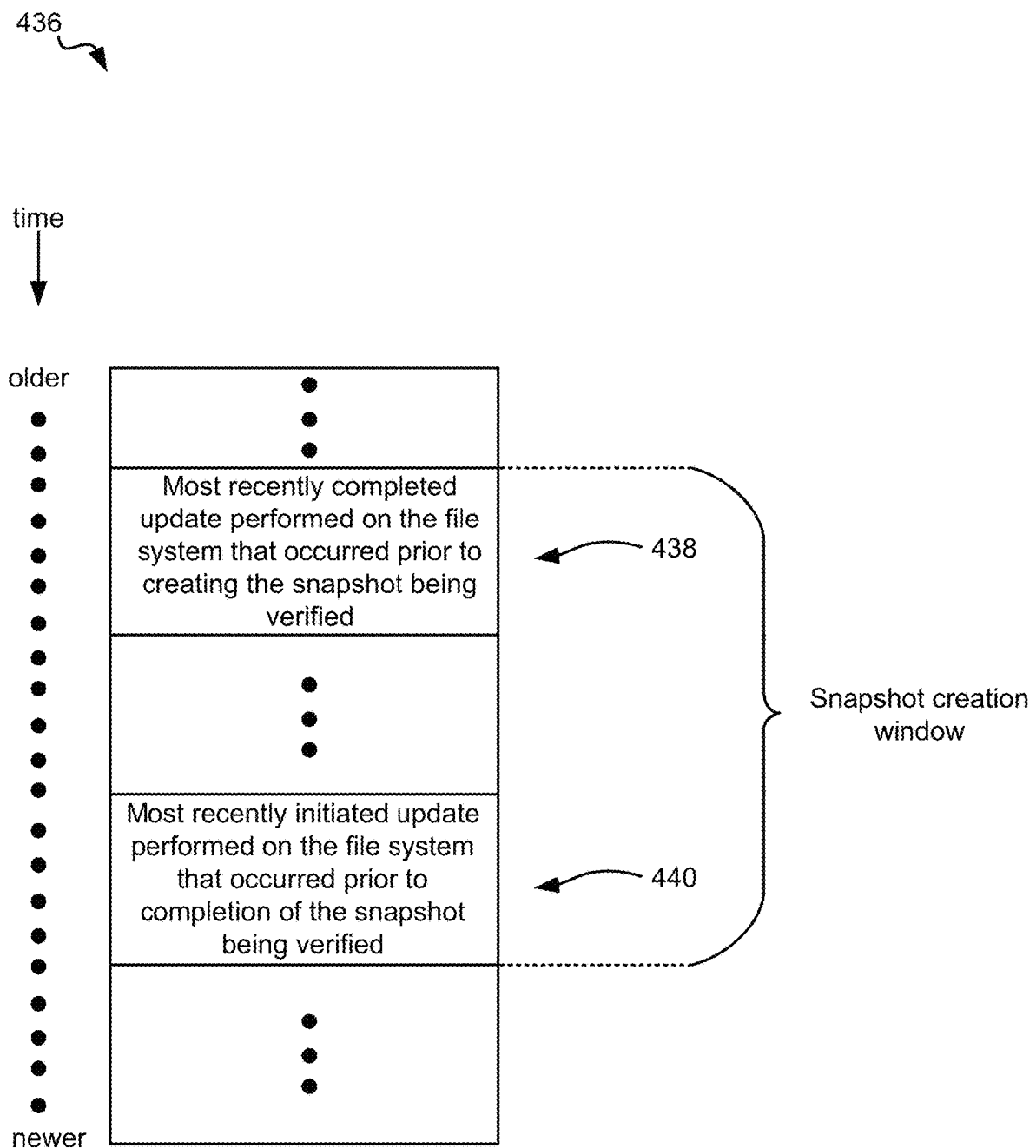
FIG. 4C is a timeline of a snapshot creation window considered in the sub-processes of FIG. 4B.

For example, according to various implementation approaches for file system snapshots, determining whether a coherent state exists between the given chunk of data of the given file of the first snapshot and one or more of the shadow records that were previously recorded considers only shadow records that were previously recorded within and abutting a snapshot creation window, e.g. see decision 424. In one approach, the snapshot creation window may be a period of time defined by the recorded times of operation 404 and operation 406. Referring momentarily to FIG. 4C, a timeline 436 provides reference to such a snapshot creation window. In the timeline 436, time continues in a downward direction, e.g., see older to newer. In such an approach, the snapshot creation window is between (inclusive) a most recently completed update performed on the file system prior to creating the first snapshot of the file system, e.g., see time 438, and a most recently initiated update performed on the file system that occurred prior to completion of the first snapshot of the file system, e.g., see time 440.

It is expected that a shadow record exists, e.g., was previously captured, for a given chunk of data, unless the region is sparse, e.g., there is no data that exists. In this case, the given file of the first snapshot may be determined to be accurate in response to a determination that all data chunks in the copy of the file in the snapshot match data in the corresponding shadow file. For context, as will be described in greater detail elsewhere below, it may be prefaced that in response to a determination that every data chunk of the given file is accurate, e.g., based on a comparing of each data chunk of the given file with the shadow file, the given file itself may be considered accurate.

In some approaches, in response to determining that no shadow records have been previously recorded within the snapshot creation window, method 400 may optionally include determining whether the given chunk of data of the given file of the first snapshot of the file system is not corrupt. A conventional technique may be used to determine whether the given chunk of data is not corrupt, or equivalently, is corrupt.

Referring again to FIG. 4B, in response to determining that no coherent state exists between the given chunk of data of the given file of the first snapshot and one or more of the shadow records, the first process includes recording an indication that the given chunk of data of the given file of the first snapshot is corrupt, e.g., see sub-operation 428. Recording such an indication may include any one or more known types of recording a determined condition of data. For example, in one approach, recording an indication that the given chunk of data of the given file of the first snapshot is corrupt may include setting a flag that is associated with the given chunk of data. In another approach, recording an indication that the given chunk of data of the given file of the first snapshot is corrupt may additionally and/or alternatively include storing a pointer to the chunk of data, e.g., where a debugging process may utilize the stored pointer during subsequent debugging. In another approach, recording an indication that the given chunk of data of the given file of the first snapshot is corrupt may additionally and/or alternatively include recording a characteristic of the corrupt given chunk of data, e.g., a name of the corrupt data chunk, a location of the corrupt data chunk in the file system, a size of the corrupt data chunk in the file system, etc., in a list that is accessed for correcting the corrupt data chunk. For example, in one approach, the first process may optionally include correcting the corrupt data of the given file of the first snapshot, e.g., using known debugging techniques, using known error correction techniques, etc. In yet another approach, recording an indication that the given chunk of data of the given file of the first snapshot is corrupt may additionally and/or alternatively include generating and/or outputting an error report, which may include information about the determined corruption.

In response to determining that a coherent state exists between the given chunk of data of the given file of the first snapshot and one or more of the shadow records, the first process includes recording an indication that the given chunk of data of the given file of the first snapshot is accurate, e.g., see operation 426.

According to various approaches, recording an indication that the given chunk of data of the given file of the first snapshot is accurate may include performing any one or more operations. For example, according to one approach, recording the indication that the given chunk of data of the given file of the first snapshot is accurate may include updating the shadow records associated with the given file of the first snapshot to reflect matching data of the existing coherent state. In another approach, recording the indication that the given chunk of data of the given file of the first snapshot is accurate may additionally and/or alternatively include storing an instruction that the given chunk of data of the given file of the first snapshot thereafter is never to be changed.

In another approach, recording the indication that the given chunk of data of the given file of the first snapshot is accurate may additionally and/or alternatively include storing an indication on the shadow file that the first snapshot is accurate. However such an operation may depend on other chunk(s) of data (if any) of the given file of the first snapshot also being verified as accurate and/or the given chunk of data being the only chunk of data of the given file of the first snapshot. For example, as illustrated by the decision 432 in FIG. 4B, in response to a determination that a coherent state exists between each of the chunks of data N of the given file of the first snapshot and one or more of the shadow records, an indication that the given file of the first snapshot is accurate is recorded, e.g., see sub-operation 434.

Moreover, the first process may include setting the current record for each chunk of data to whichever was determined to be the correct record and/or generating a current record if none was determined to exist, e.g., see sub-operation 435. To clarify, a correct record is a state of a chunk of data that is determined (using the first process) to be accurate, e.g., not corrupt. Thereafter, other previous records are no longer relevant, and the matching record of each respective chunk is the starting position, e.g., known location of accurate data, of each chunk. As noted above, after initial validation, no subsequent updates to the shadow file may be performed when it is associated with a file in an immutable snapshot. Subsequent validations of this file may only need to read the shadow file.

After verifying the initial contents of the snapshot, the input/output tasks may be de-quiesced, e.g., see operation 414 of method 400. De-quiescing the input/output tasks may (eventually) trigger CoW as the input/output tasks continue to modify the files of the data storage system on which such tasks correlate to. In some approaches, the subsequent deliberate modification of files known to have data in snapshots may be used to trigger CoW as part of evaluating its correct implementation.

In some approaches, in addition to and/or alternative to verifying the initial contents of a snapshot, method 400 may include verifying the contents of one or more snapshots of the file system over time, e.g., see operation 415 of method 400. Verifying the contents of one or more snapshots of the file system over time assists in identifying and correcting corruption that may result in the snapshot or the live file system over time. This is important because the state of data in the live file system will likely change over time. For example, as writes are performed on the file system, CoW will cause the on-disk location of the data in the snapshots to change, e.g., see FIG. 3. Blocks that were originally in the live file system and referenced in various snapshots thanks to CoW will be copied to various snapshots as the live file system is modified. As a result, there are many ways that a file system's CoW implementation may potentially misbehave. For example, two specific examples of such misbehavior include copying, and pointer manipulation and copying. For example, with reference again to logical representation 300 FIG. 3, in an efficient CoW implementation, blocks, e.g., data contents of the snapshot such as A and B of FIG. 3, in one snapshot may point to blocks in another snapshot. When a snapshot is deleted, any blocks that the snapshot "owns" are copied to one of the snapshots that points to these blocks. Moreover, for any blocks that the snapshot does not "own," the pointers of dependents point to whatever such blocks pointed to, e.g., as when removing a node from a linked list. If copying is done incorrectly or to the wrong location, or if pointers are updated incorrectly, even parts of a snapshot that have not diverged from the live file system may be corrupted as older snapshots are deleted.

The above described possibilities of corruption are only a few of the reasons that the data contents of files of the file system and snapshots may be verified over time, e.g., on an ongoing basis. This is because even if the data in a snapshot is fixed from a corrupt state and/or despite the initial contents of a snapshot being verified, e.g., see operation 412 of method 400, the location of disk blocks containing that data will change as the live file system is modified.

Figure 4D:
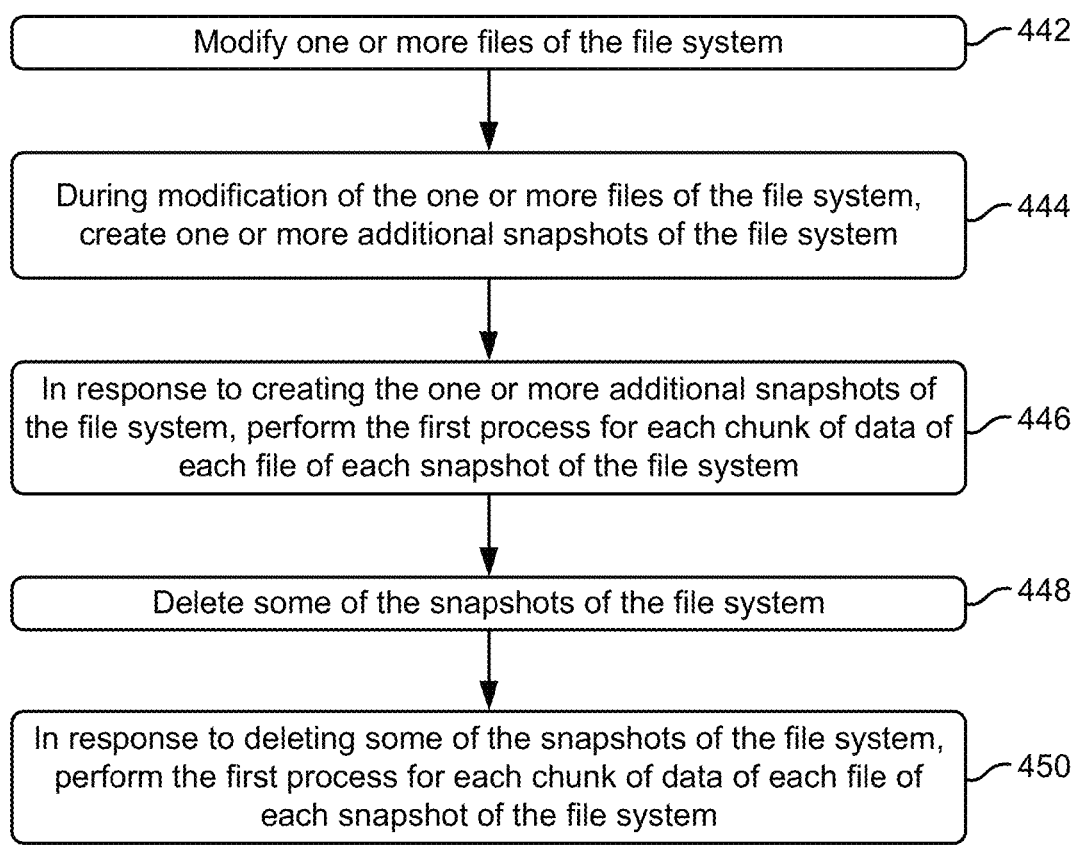
FIG. 4D is a flowchart of sub-processes of an operation of the flowchart of the method of FIG. 4A.

Referring now to FIG. 4D, several sub-processes are illustrated in accordance with one embodiment, one or more of which may be used for performing operation 415 of FIG. 4A. However, it should be noted that the sub-processes of FIG. 4D are illustrated in accordance with one embodiment which is in no way intended to limit the embodiments and/or approaches described herein. Moreover, although the sub-processes of the following descriptions of FIG. 4D refer to a second process being performed once in the file system, the second process is preferably performed multiple times, e.g., over time, in order to ensure that files of the first snapshot and/or any files of other snapshots of the file system remain accurate.

With continued reference to FIG. 4D, the second process includes modifying one or more files of the file system, e.g., see sub-operation 442. Recall that the second process is in some preferred approaches performed subsequent de-quiesce of the input/output tasks of the file system. Accordingly, the modifying of one or more files of the file system is performed while input/output tasks of the file system are not quiesced, e.g., while the file system is live.

The files of the file system that are selected for modifying may depend on the approach, e.g., a predetermined number of most recently accessed files, a predetermined number of most recently updated files, a predetermined number of most frequently accessed files, etc. In some other approaches, the files of the file system that are modified may be randomly selected, e.g., using a known type of random selection generator.

During modification of the one or more files of the file system, one or more additional snapshots of the file system may be created, e.g., see sub-operation 444. In one approach, at least some of the additional snapshots of the file system may be created at random times. In another approach, at least some of the additional snapshots of the file system may be created at preset times, e.g., simulating snapshot frequencies that might be chosen by a typical administrator of the file system.

In response to creating the one or more additional snapshots of the file system, the first process may be performed for each chunk of data of each file of each snapshot of the file system, e.g., see sub-operation 446. Note that it is likely that one or more of the snapshots of the file system existed prior to the modification of the one or more files of the file system, e.g., due to the file system continuing to create snapshots of the file system over time. Accordingly, such verification may include verifying the data contents of files of all snapshots that existed before the additional snapshots were taken and the contents of files of the additional snapshots.

Sub-operation 448 of FIG. 4D includes deleting some of the snapshots of the file system. In some approaches, at least some of the snapshots of the file system may be deleted at random times. However, sub-operation 448 preferably includes deleting only some of the snapshots of the data file. As will be described below, e.g., see sub-operation 450, only some of the snapshots of the file system are deleted because the snapshots that remain after the deleting are used in verifying the content of files of the file system.

In response to deleting some of the snapshots of the file system, the first process may be performed for each chunk of data of each file of each snapshot of the file system (the remaining snapshots that were not deleted), e.g., see sub-operation 450.

With general reference now to method 400, it should be noted that although the verification processes, e.g., the first process and/or the second process, described in various approaches to be performed on "chunk(s)" of data of the file system, such approaches assume that there are no node failures present in the file system. However, in some approaches, in response to one or more node failures being present in the file system, the verification processes may be performed with respect to sectors, e.g., the smallest addressable units of the file system, of the data chunks of the file system. Note that updates to sectors are atomic. In other approaches, the verification processes may be performed with respect to sectors of the data chunks of the file system for any reason.

By verifying the initial data contents of a snapshot and/or verifying the data contents of a snapshot over time, the data of files of the file system will thereafter be accurate and available for using in debugging errors that occur within the file system. This is important because as mentioned elsewhere above, clients that utilize file systems for storing data therein anticipate that the data, when thereafter accessed, is accurate. This is also important because without the ability to verify the CoW behavior of snapshot implementations, which conventional file systems are not able to do, such corrupt instances of data reside in snapshots, unbeknownst to users. This is because conventional file systems are not able to obtain shadow records upon a snapshot being taken, nor do such conventional systems address issues in verifying the CoW behavior of snapshot implementations. In sharp contrast, using various embodiments and/or approaches described herein, corrupt instances of data are discovered and moreover corrected before the corrupt data is allowed to cause problems within the file system, such as those stated above.

Although the embodiment of method 400 includes capturing at least the first snapshot before input/output tasks of the file system are quiesced, in another embodiment, the first snapshot and/or other snapshots may be created while input/output tasks of the file system are quiesced, e.g., see method 500.

Figure 5:
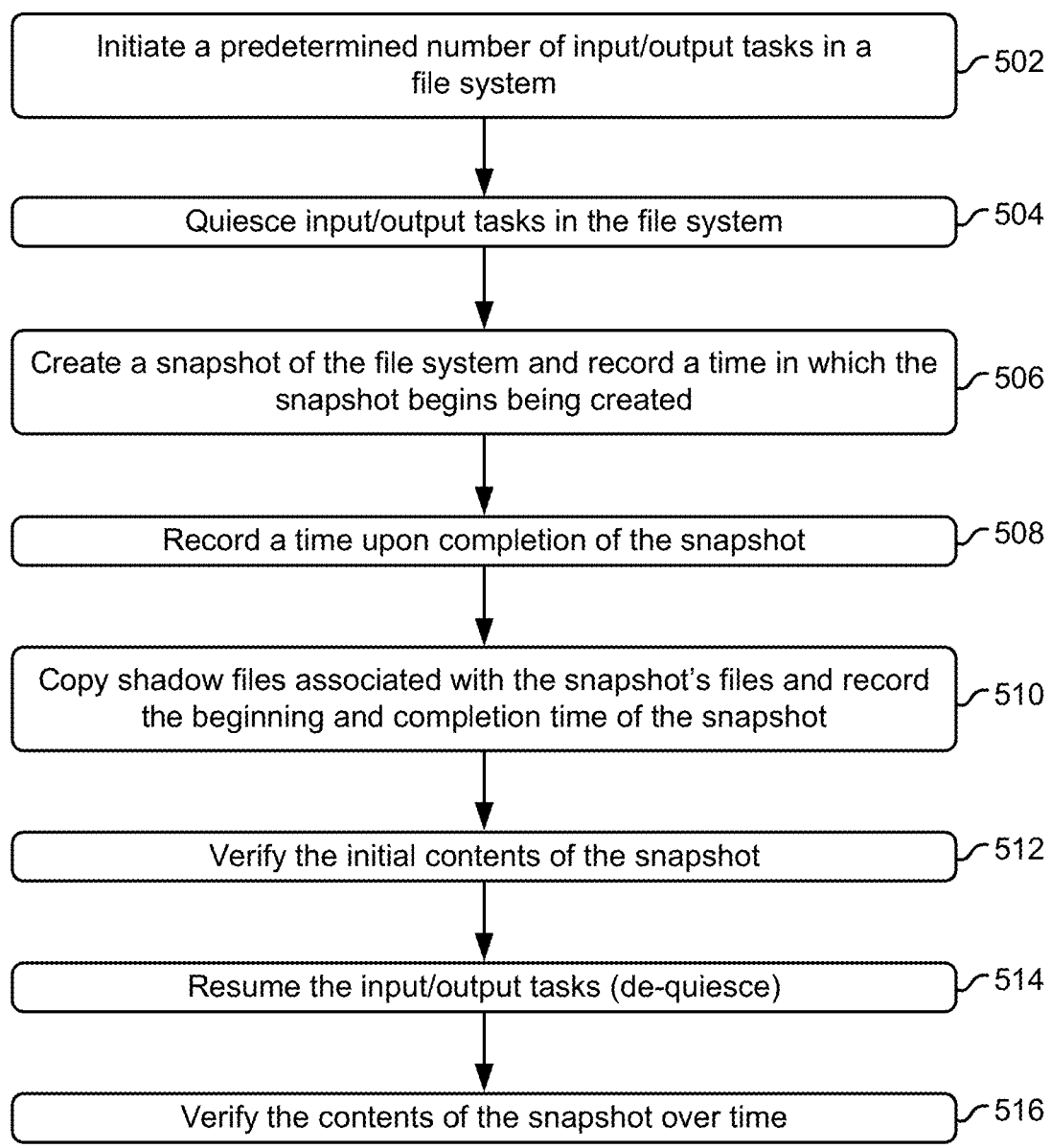
FIG. 5 is a flowchart of a method, in accordance with one embodiment.

Referring to FIG. 5, a flowchart of a method 500 is shown according to one embodiment. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Operation 502 of method 500 includes initiating a predetermined number of input/output tasks in a file system. The file system may include any known type of file system, however, in preferred approaches, the file system is a POSIX-compliant storage system that supports snapshots. Moreover, the type of input/output tasks performed may include any type of input/output tasks, and may be tasks that, e.g., are randomly selected to be performed, are scheduled to be performed, are preset to be performed for verifying a snapshot, etc.

The input/output tasks of the file system are quiesced, e.g., paused, e.g., see operation 504. The quiesce may accomplished using any known standard inter-process communication techniques. For example, in one approach, UNIX® signals are used for quiesce of the input/output tasks. In another approach, tests for file existence are additionally and/or alternatively used in order to quiesce the input/output tasks. In yet another approach, fcntl locks are additionally and/or alternatively used in order to quiesce the input/output tasks.

It should be noted that in the present embodiment, the input/output tasks of the file system are quiesced prior to capturing a snapshot of the file system, e.g., see operation 506. This is different than method 400 in which input/output tasks of the file system are quiesced only after the completion of the creation of a snapshot of the file system, e.g., see operations 404-408 of method 400. Several distinctions that may result from the quiesce of the input/output tasks prior to capturing a snapshot of the file system versus a quiesce of the input/output tasks after capturing a snapshot of the file system will now be described below according to some approaches.

From a processing perspective, a file system utilizing method 500 may perform less processing as a result of a quiesce of the input/output tasks prior to capturing a snapshot of the file system. In some approaches this preserving of processing potential may be useful, however the additional processing consumed in a quiesce of the input/output tasks after capturing a snapshot of the file system of method 400 is still useful in order to create and thereafter verify instances of corruptions in the file system, e.g., bugs. This is because as a result of a quiesce of the input/output tasks only after capturing a snapshot of the file system, numerous input/output tasks are likely in the process of performing updates at the moment that the file system's internal quiesce occurs. Accordingly, the file system's internal quiesce is more strenuously taxed, resulting in a greater possible diversity of the contents of files in the snapshots may be more extensive than the contents of the files of the snapshots would otherwise be if the input/output tasks were alternatively quiesced prior to capturing a snapshot of the file system.

Moreover, from a development/testing perspective, method 500, e.g., a quiesce of the input/output tasks prior to capturing a snapshot of the file system may be more practical/easier to implement from a testing perspective than a quiesce of the input/output tasks after capturing a snapshot of the file system. This is because in early phases of a test cycle, a developer may not be concerned with specific details of an error report, and may instead simply want to know whether the file system is either functional or crashing during use.

Once a developer is confident that the file system is functional and not crashing during use, method 400, e.g., a quiesce of the input/output tasks after capturing a snapshot of the file system may be implemented in order test the file system under the stress of more realistic customer workloads. This is because stopping input/output tasks is unproductive or counterproductive for customers. Accordingly, the quiesce of the input/output tasks after capturing a snapshot of the file system, e.g., see method 500, allows such input/output tasks to remain active while snapshot(s) are being obtained, increasing the degree of realism of the test.

With continued reference to method 500, operation 506 of method 500 includes beginning the creation of a snapshot of the file system. A time in which the snapshot begins being created may be recorded.

A time of completion of the snapshot is recorded, e.g., see operation 508.

According to some approaches, a copy is made of the shadow files for each file of the file system that is to be verified, e.g., see operation 510. Moreover, the beginning and completion time of the snapshot may be recorded. In one approach, this copy may be stored locally in the file system. However, in another approach, the copy may additionally and/or alternatively stored in any other location. In addition to storing the copy of the shadow files, the copy of the shadow files may be stored with an association to the snapshot. In other words, each copy of the shadow files may be stored with an indication of which particular snapshot the copy is to be used for verifying, e.g., journal files of a copy of the shadow files of the first snapshot are stored with an indication that they are to be thereafter used in verifying the first snapshot. Accordingly, in order to verify the first snapshot, the indication may be accessed to determine which copy of the shadow files are to be used for the verifying.

In some preferred approaches, the shadow files are associated with the snapshot. For example, one technique that may be used for associating the shadow files with the snapshots includes copying each shadow file into a new directory with the same name as the snapshot.

The initial contents of the snapshot may be verified, e.g., see operation 512. In some preferred approaches, the initial contents of the snapshot may be verified using the first process described elsewhere herein, e.g., see FIG. 4B.

Moreover, subsequent resuming of the input/output tasks, e.g., see operation 514, the contents of the snapshot may be verified over time, e.g., see operation 516. In some preferred approaches, the contents of the snapshot may be verified over time using the second process described elsewhere herein, e.g., see FIG. 4D.

It is worth noting that snapshots may be writable. In this case, various approaches and/or embodiments described herein, e.g., such as methods 400, 500, may optionally be applied recursively, with new input/output applications launched against the snapshot that use shadow files of the copies made during the quiesce described elsewhere above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
performing a first process for each chunk of data of each file of a snapshot of a file system, wherein the first process includes:
reading a given chunk of data of a given file of a first snapshot of the file system;
reading shadow records of a shadow file of the first snapshot, the shadow records being associated with the given file of the first snapshot;
comparing the given chunk of data of the given file of the first snapshot with the shadow records for determining whether a coherent state exists between the given chunk of data of the given file of the first snapshot and one or more of the shadow records that were recorded in a snapshot creation window; wherein the snapshot creation window is between a most recently completed update performed on the file system prior to creating the first snapshot of the file system and a most recently initiated update performed on the file system that occurred prior to completion of the first snapshot of the file system;
in response to determining that no coherent state exists between the given chunk of data of the given file of the first snapshot and one or more of the shadow records, recording an indication that the given chunk of data of the given file of the first snapshot is corrupt;
in response to determining that a coherent state exist between the given chunk of data of the given file of the first snapshot and one or more of the shadow records, recording an indication that the given chunk of data of the given file of the first snapshot is accurate;
performing a second process several times, wherein the second process includes:
modifying one or more files of the file system;
during modification of the one or more files of the file system, creating one or more additional snapshots of the file system;
in response to creating the one or more additional snapshots of the file system, performing the first process for each chunk of data of each file of each snapshot of the file system;
deleting some of the snapshots of the file system; and
in response to deleting some of the snapshots of the file system, performing the first process for each chunk of data of each file of each snapshot of the file system, wherein the one or more additional snapshots of the file system are created at random times, wherein the deleted snapshots of the file system are deleted at random times.

2. The computer-implemented method of claim 1, comprising: in response to a determination that a coherent state exists between each of the chunks of data of the given file of the first snapshot and one or more of the shadow records, recording an indication that the given file of the first snapshot is accurate.

3. The computer-implemented method of claim 1, wherein the first snapshot of the file system is created prior to input/output tasks of the file system being quiesced.

4. The computer-implemented method of claim 1, wherein the first snapshot of the file system is created while input/output tasks of the file system are quiesced.

5. The computer-implemented method of claim 1, wherein recording the indication that the given chunk of data of the given file of the first snapshot is accurate includes performing at least one operation selected from the group consisting of: updating the shadow records associated with the given file of the first snapshot to reflect matching data of the existing coherent state, storing an indication on the shadow file that the first snapshot is accurate, and storing an instruction that the given chunk of data of the given file of the first snapshot thereafter is never to be changed.

6. The computer-implemented method of claim 1, wherein the modifying of one or more files of the file system is performed while input/output tasks of the file system are not quiesced.

7. The computer-implemented method of claim 1, wherein one or more of the snapshots of the file system existed prior to the modification of the one or more files of the file system.

8. The computer-implemented method of claim 1, wherein the modified files of the file system are randomly selected using a random selection generator.

9. A computer program product for verifying an integrity of data files stored in copy-on-write based file system snapshots, the computer program product comprising a computer readable storage medium having program instructions embodied therewith, the program instructions readable and/or executable by a computer to cause the computer to perform a first process for each chunk of data of each file of a snapshot of a file system, wherein the first process includes:
reading, by the computer, a given chunk of data of a given file of a first snapshot of the file system;
reading, by the computer, a plurality of shadow records of a shadow file of the first snapshot, the shadow records being associated with the given file of the first snapshot based on the shadow file being copied to a new directory, wherein a name of the new directory and the first snapshot match;
comparing, by the computer, the given chunk of data of the given file of the first snapshot with the shadow records for determining whether a coherent state exists between the given chunk of data of the given file of the first snapshot and one or more of the shadow records that were recorded in a snapshot creation window, wherein the snapshot creation window is between a most recently completed update performed on the file system prior to creating the first snapshot of the file system and a most recently initiated update performed on the file system that occurred prior to completion of the first snapshot of the file system, wherein a first of the shadow records was previously recorded before initiation of the most recently initiated update;

in response to determining that no coherent state exists between the given chunk of data of the given file of the first snapshot and one or more of the shadow records, recording, by the computer, a size of the given chunk of data of the given file in a list;

performing, by the computer, debugging to correct corrupt data of the given chunk of data, wherein the list is accessed while performing the debugging; and in response to determining that a coherent state exist between the given chunk of data of the given file of the first snapshot and one or more of the shadow records, recording, by the computer, an indication that the given chunk of data of the given file of the first snapshot is accurate, wherein recording the indication includes updating the shadow records associated with the given file to reflect matching data of the existing coherent state.

10. The computer program product of claim 9, the program instructions readable and/or executable by the computer to cause the computer to: in response to a determination that a coherent state exists between each of the chunks of data of the given file of the first snapshot and one or more of the shadow records, record, by the computer, an instruction that the given chunk of data of the given file of the first snapshot thereafter is never to be changed.

11. The computer program product of claim 9, wherein the first snapshot of the file system is created prior to input/output tasks of the file system being quiesced, wherein a second of the shadow records was previously recorded upon completion of the most recently completed update.

12. The computer program product of claim 9, wherein the first snapshot of the file system is created while input/output tasks of the file system are quiesced, wherein a second of the shadow records was previously recorded after initiation of the most recently initiated update.

13. The computer program product of claim 9, wherein recording the indication that the given chunk of data of the given file of the first snapshot is accurate includes performing, by the computer, at least one operation selected from the group consisting of: updating the shadow records associated with the given file of the first snapshot to reflect matching data of the existing coherent state, storing an indication on the shadow file that the first snapshot is accurate, and storing an instruction that the given chunk of data of the given file of the first snapshot thereafter is never to be changed.

14. The computer program product of claim 9, the program instructions readable and/or executable by the computer to cause the computer to perform a second process several times, wherein the second process includes:

modifying, by the computer, one or more files of the file system;

during modification of the one or more files of the file system, creating, by the computer, one or more additional snapshots of the file system;

in response to creating the one or more additional snapshots of the file system, performing, by the computer, the first process for sectors of each chunk of data of each file of each snapshot of the file system;

deleting, by the computer, some of the snapshots of the file system; and in response to deleting some of the snapshots of the file system, performing the first process for sectors of each chunk of data of each file of each snapshot of the file system.

15. The computer program product of claim 14, wherein the modifying of one or more files of the file system is performed while input/output tasks of the file system are not quiesced.

16. The computer program product of claim 14, wherein one or more of the snapshots of the file system existed prior to the modification of the one or more files of the file system.

17. The computer program product of claim 14, wherein the one or more additional snapshots of the file system are created at random times, wherein the deleted snapshots of the file system are deleted at random times.

18. A system, comprising:

a processor;

a memory module coupled to the processor; and logic integrated with the processor, executable by the processor, or integrated with and executable by the processor, the logic being configured to:

perform a first process for sectors of each chunk of data of each file of a snapshot of a file system, wherein the first process includes:

reading sectors of a given chunk of data of a given file of a first snapshot of the file system;

reading a plurality of shadow records of a shadow file of the first snapshot, the shadow records being associated with the given file of the first snapshot based on the shadow file being copied to a new directory, wherein a name of the new directory and the first snapshot match;

comparing the sectors of the given chunk of data of the given file of the first snapshot with the shadow records for determining whether a coherent state exists between the sectors of the given chunk of data of the given file of the first snapshot and one or more of the shadow records that were recorded in a snapshot creation window, wherein the snapshot creation window is between a most recently completed update performed on the file system prior to creating the first snapshot of the file system and a most recently initiated update performed on the file system that occurred prior to completion of the first snapshot of the file system, wherein a first of the shadow records was previously recorded upon completion of the most recently completed update, wherein a second of the shadow records was previously recorded before initiation of the most recently initiated update, wherein a third of the shadow records was previously recorded after initiation of the most recently initiated update;

in response to determining that no coherent state exists between the sectors of the given chunk of data of the given file of the first snapshot and one or more of the shadow records, recording an indication that the sectors of the given chunk of data of the given file of the first snapshot is corrupt, wherein recording the indication includes storing a pointer to the sectors of the given chunk of data to use during a debugging process that corrects corrupt data of the sectors of the given chunk of data, wherein the pointer is stored on the memory module coupled to the processor;

in response to determining that a coherent state exist between the sectors of the given chunk of data of the given file of the first snapshot and one or more of the shadow records, recording an indication that the sectors of the given chunk of data of the given file of the first snapshot is accurate; and in response to a determination that a coherent state exists between each of the sectors of the given chunk of data of the given file of the first snapshot and one or more of the shadow records, recording an instruction that the given chunk of data of the given file of the first snapshot thereafter is never to be changed.

\* \* \* \* \*